Patented Nov. 5, 1929

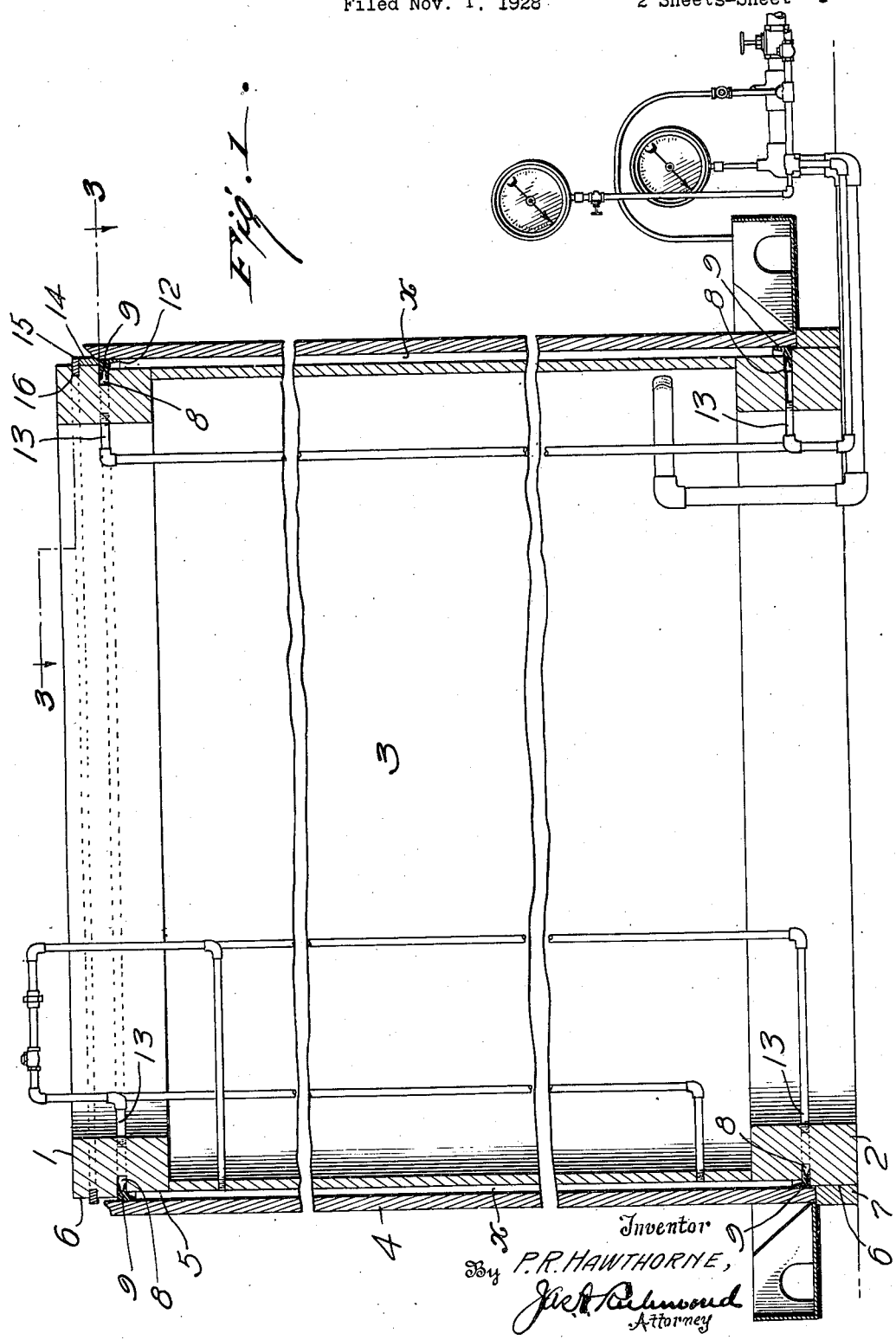

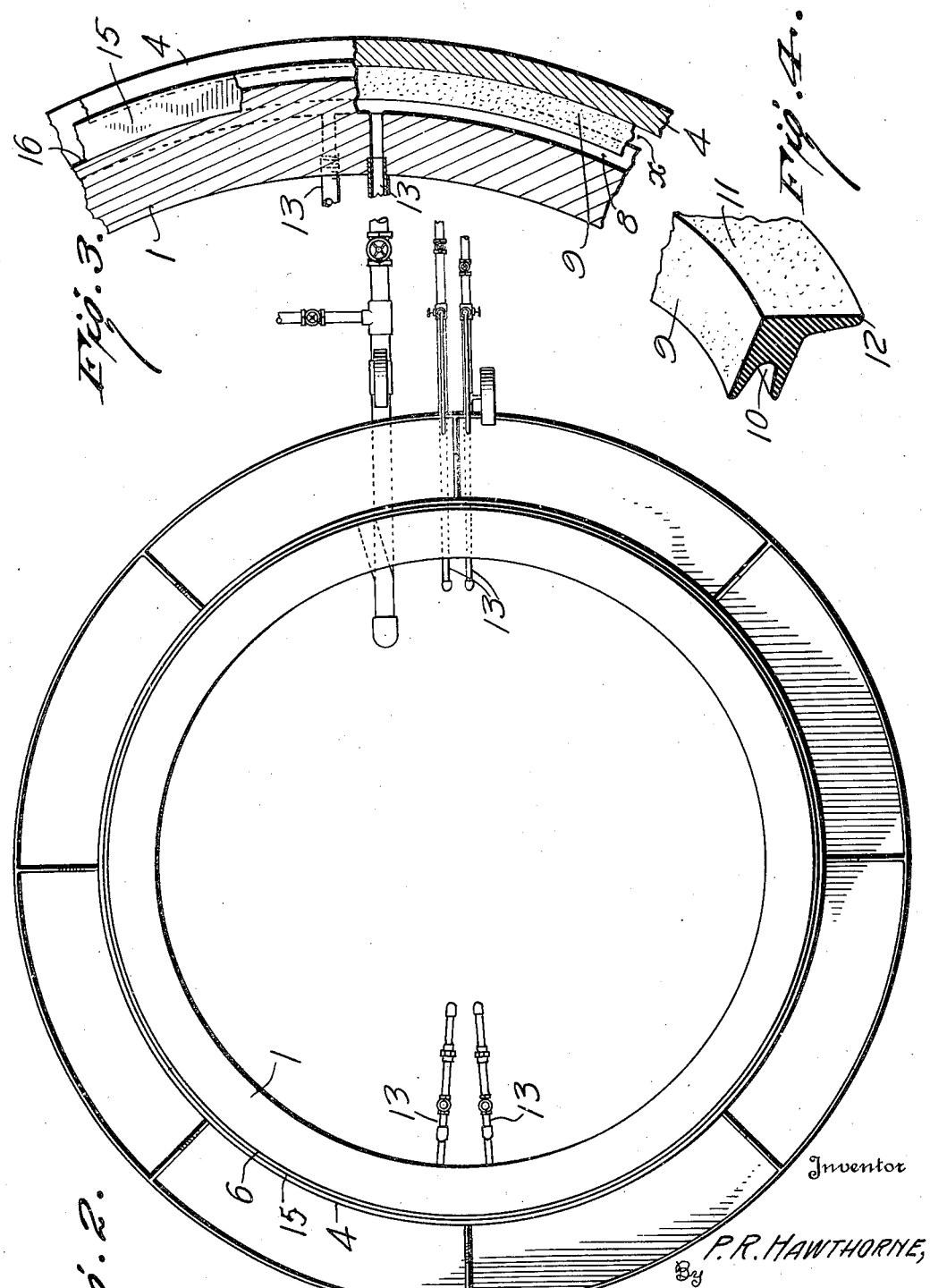

1,734,805

UNITED STATES PATENT OFFICE

PRIMM R. HAWTHORNE, OF SHARON, PENNSYLVANIA, ASSIGNOR TO THE PETROLEUM IRON WORKS COMPANY, OF SHARON, PENNSYLVANIA, A CORPORATION OF OHIO

APPARATUS FOR TESTING PIPE

Application filed November 1, 1928. Serial No. 316,551.

This invention provides a method of and apparatus for testing pipe and other cylindrical shapes under hydrostatic pressure, and particularly units of considerable magnitude. In the hydrostatic testing of pipe sections of considerable transverse and longitudinal dimensions, the usual practice consists in welding closure sections to the ends of the pipe and then applying hydrostatic pressure for a predetermined time. This method entails a considerable expenditure of time, material and labor because the closure sections have to be welded to place and, ultimately, removed after testing, and a large volume of water must be pumped into and out of the article undergoing test.

The present method was designed with the view of obviating the necessity for connecting any part or parts directly to the pipe or other article undergoing test while at the same time insuring positive sealing against any pressure leakage during the test period. Again, the improved method reduced to the minimum the amount of water required for the test and facilitates direct handling of the pipe in positioning it for and removing it after test.

In one aspect the nature of the invention consists in establishing, within the article to be tested, a more or less solid pressure-resisting body having a diameter slightly less than the inside diameter of the section being tested, utilizing this body to support expansible gaskets, normally disposed within the periphery of the body, and responsive to expansion to engage the adjacent wall of the pipe section in a manner to seal the juncture; utilizing hydrostatic pressure in the maintenance of the seal; and, following effective sealing, admitting water to the comparatively narrow space between the pressure-resisting body and the pipe and subjecting such to the testing pressure.

The invention also contemplates as an important object thereof the provision of means or apparatus by which the method is carried out.

A further object of the invention is the provision of an expansible gasket constructed, adapted and arranged to permit the application of pressure to expand it and otherwise formed to utilize hydrostatic pressure to assist the sealing action.

Suitable apparatus for carrying out the method is illustrated in the accompanying drawings, in which—

Figure 1 is a vertical sectional view showing a pipe section in position to be tested.

Fig. 2 is a plan view.

Fig. 3 is a transverse section through one of the rings at the respective ends of the body.

Fig. 4 is a broken perspective view of the gasket.

The improved apparatus comprises upper and lower rings 1 and 2 designed to be welded or otherwise secured to the respective ends of a cylindrical shell or pipe-like section 3, the outside diameter of which is slightly less than the inside diameter of the pipe section to be tested, which latter is indicated at 4. The outside diameter of said rings immediately beyond the ends of the shell, as at 5, corresponds to that of the shell, such rings, beyond the portion 5, being of increased diameter, as evidenced by the shoulder 6 which substantially responds to the inside diameter of the pipe section 4, to be tested; the relative diameters being such that element 4 may slide freely over the shouldered portion 6 of the upper ring.

A pipe section support in the form of an annular ring 7 is welded or otherwise secured to the shouldered portion 6 of the lower ring.

Rings 1 and 2 are each formed with an annular channel 8, the upper wall of which is coincident with the shoulder formed by the portion 6 of the respective rings. Channels 8 are of appreciable depth and are adapted to slidably receive the sealing gasket hereinafter referred to.

The distance between the pair of shoulders 6 substantially corresponds to the length of the pipe section being tested, in order, as will later appear, that the entire inside area of the pipe section may be simultaneously subjected to hydrostatic test.

Evidently the water space (about $1\tfrac{3}{8}''$) provided by the end closures, heads or rings 1 and 2, the inner wall of the piece to be tested and the outer wall of the shell 3, requires a relatively small quantity of water compared to the thousands of gallons that would be necessary to fill the pipe under ordinary methods of testing.

The sealing rings or gaskets 9 shown in detail in Fig. 4 have a normal circumference which is less than the inside diameter of the piece to be tested. Rings 9 are constructed of rubber or other elastic or expansible material suited to gasket purposes. They are of general L shape in cross-section, one limb being cleft at 10 to accommodate itself to the channels 8, the other limb 11 having a lip or terminal 12, which adds to the inherent flexibility of the gasket.

Ordinarily the sealing gasket crowds the groove or channel 8 and is out of line of the path of the test piece when the same is being applied or removed, but when fluid pressure is applied to the recessed or cleft portion of the gasket, the latter is forced against the proximate wall of the piece to be tested.

Provision is made, as through pipes 13, for introducing pressure, into the channels 8 inwardly of the gaskets, and provision also is made for introducing water to the water space X for testing purposes. Such provisions simply are conventionally illustrated, the details being relatively unimportant.

In practicing the invention, and having provided an assembly consisting of shell 3 and its fittings, shell 3 is filled with cement or other filling to prevent collapse under high pressure. The pipe 4 is then lowered until its lower edge rests upon the support 7. The lower gasket is then substantially at the lower end of pipe 4 and the upper gasket substantially in line with the upper end thereof. Owing to the slight variation in diameter between the exterior of the body and the interior of the pipe section being tested, say for example a space approximating $\frac{1}{8}''$ in width, it is apparent that but a comparatively small quantity of water is required.

In order to hold the upper gasket against vertical displacement under hydrostatic pressure, segments 14 are placed in position against the peripheral surface of the portion 6 of the upper ring and overlying the gasket. The segments are prevented from upward movement by a ring-like abutment 15 formed in sections and seating in an annular groove 16 in the portion 6 of the upper ring and projecting beyond said section to overlie the upper ends of segments 14.

Air under pressure is then admitted to the channels 8, bodily distending the gaskets and forcing their sealing edges into contact with the pipe section being tested at the respective ends of the latter. The desired hydrostatic pressure is then applied to the space between the testing shell and the element undergoing test.

Under the present method it will be noted that upon the withdrawal of the gasket distending pressure, the gaskets of their own volition will recede into the channels at least to an extent to be out of the path of the test piece when the latter is being applied or removed. Thus, the test pieces readily may be applied to or removed from the apparatus without obstruction or without the necessity of adjusting or manipulating any operative part.

The method obviates the necessity of attaching any closure or other sealing element directly to the object being tested, for, on the release of gasket distending pressure, such object is wholly free and no operation thereon is required to restore its normal condition.

It will of course be appreciated that a single apparatus of the character described readily may serve for any number of pipe sections of similar diameter and length and that a change in dimensions only is required in the event of testing other pipe sections of different diameter and length.

An important feature of the present invention and method is the facility with which the ends of the pipe section being tested may be sealed against leakage during the admission of hydrostatic pressure, and furthermore the provision of means whereby a comparatively small quantity of water is required for the exigencies of the test.

The gasket described is complete in itself and will serve automatically to seal the respective ends of the object being tested without the addition of spreaders or other mechanical devices and will, when distending pressure is relieved, automatically return to a position wholly clear of the piece under test. Furthermore, the gasket construction is such that hydrostatic pressure may be and is availed of to enhance the sealing capacity.

Having described my invention, I claim:

1. Apparatus for testing pipe, including an interior pressure-resisting body having an outside diameter slightly less than the inside diameter of the pipe section being tested, said body adapted to be arranged concentrically within the pipe section being tested, sealing means carried by the body and adapted to be projected into contact with the pipe section to seal the space between the body and pipe section, and means for admitting testing fluid to such space.

2. Testing apparatus for use in hydrostatically testing pipe sections, comprising a pressure-resisting body having an outside diameter slightly less than the inside diameter of the pipe section to be tested, means carried by the body for supporting the pipe section in spaced concentric relation, sealing members caried by the body, means for projecting the sealing members into sealing contact with the pipe section, and means for admitting testing fluid to the space between the body and pipe section.

3. Apparatus for hydrostatically testing pipe sections of large diameter, comprising a pressure-resisting body having an outside diameter slightly less than the inside diameter of the pipe section, means on the body for supporting the pipe section in spaced concentric relation, expansible sealing gaskets carried by the body and normally free of contact with the pipe section, means for distending the gaskets to force them into sealing contact with the pipe section, and means for admitting testing fluid to the space between the body and pipe section.

4. Apparatus for hydrostatically testing pipe sections of large diameter, comprising a pressure-resisting body having an outside diameter slightly less than the inside diameter of the pipe section, means on the body for supporting the pipe section in spaced concentric relation, expansible sealing gaskets carried by the body and normally free of contact with the pipe section, means for distending the gaskets to force them into sealing contact with the pipe section, and means for admitting testing fluid to the space between the body and pipe section, said gasket having lips designed to be forced into sealing contact with the pipe section in response to testing pressure.

5. Apparatus for hydrostatically testing pipe sections of large diameter, including a pressure-resisting body having an outside diameter slightly less than the inside diameter of the pipe section, means on the body for supporting the pipe section in spaced concentric relation to the body, said body being formed adjacent its respective ends with annular grooves, expansible gaskets operative in said grooves and normally free of contact with the pipe section, a pressure medium operative within the grooves to force the gaskets into sealing contact with the pipe section, and means on the gaskets to utilize the testing pressure as additional gasket sealing pressure.

6. Apparatus designed for use in the hydrostatic testing of tubular objects, comprising a filler having a diameter slightly less than that of the object to be tested, rings secured to the respective ends of the filler, said rings having annular grooves, expansible ring gaskets seated in the grooves, and means for admitting fluid under pressure to the grooves to distend the gaskets.

7. Apparatus designed for use in the hydrostatic testing of tubular objects, comprising a filler having a diameter slightly less than that of the object to be tested, rings secured to the respective ends of the filler and having annular grooves, expansible ring gaskets seated in the grooves, means for admitting fluid under pressure to the grooves inwardly of the gaskets to distend the same, and means on one of the rings to support the object in spaced concentric relation to the filler.

8. Apparatus designed for use in the hydrostatic testing of pipe sections of large diameter, comprising a hollow body having a diameter slightly less than that of the pipe section to be tested, rings secured to the respective ends of the body, said rings being formed with annular grooves beyond the body, expansible ring gaskets seated in the grooves, means for admitting fluid under pressure to the grooves inwardly of the gaskets to distend the same, and a filling for the body.

In testimony whereof I affix my signature.

PRIMM R. HAWTHORNE.